Oct. 26, 1937.   R. OPPENHEIM   2,097,077
DEPOLARIZING ELECTRODE FOR ELECTRIC BATTERIES
Filed Jan. 7, 1932
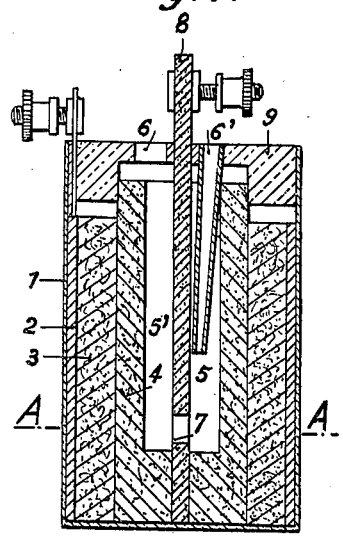
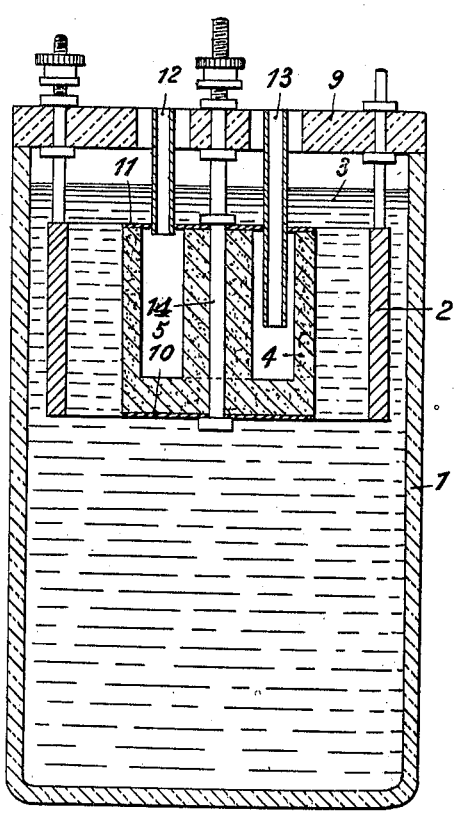
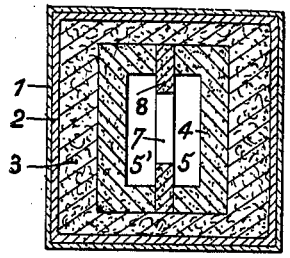
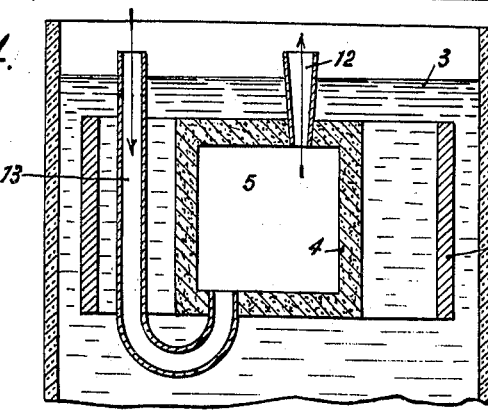
INVENTOR
RENÉ OPPENHEIM
BY
Haseltine, Lake & Co.
ATTORNEYS Patented Oct. 26, 1937

2,097,077

UNITED STATES PATENT OFFICE 2,097,077

DEPOLARIZING ELECTRODE FOR ELECTRIC BATTERIES

René Oppenheim, Gennevilliers, France, assignor to Societe Anonyme Le Carbone, Paris, France Application January 7, 1932, Serial No. 585,244
In France February 28, 1931

2 Claims. (Cl. 136—86)

It is known to use porous bodies as depolarizing electrodes for electric batteries, such porous bodies being made, for example, of agglomerated carbon and partially immersed in the electrolyte in which the circulation of the depolarizing gases is facilitated by suitable means.

The output of these batteries is limited by the speed at which the porous body absorbs the atmospheric gases in order to bring them in contact with the gases produced by the normal reactions of the cell. In most constructional forms, the porous body has the form of a cylinder or of a parallelepiped and disposed vertically in the centre of a container containing the electrolyte and the negative electrode. It will easily be understood that the distribution of the gases of the atmosphere in the porous body does not take place uniformly, the path to be traversed by these gases being much longer in order to reach the lower part of the porous body than for saturating the upper part.

Many contrivances have been conceived for remedying this drawback, such for example as the use of the porous body itself as recipient for the cell of the battery, but these contrivances have the drawback of constituting batteries the manipulation of which is more delicate and necessitates particular care than that of the batteries at present used.

It has also been proposed to bore vertical channels in the porous body with the object of bringing the atmospheric air directly into contact with the lower part of the porous body. This arrangement is not, however, entirely satisfactory because the air contained in these channels is renewed only with difficulty.

The object of the present invention is to completely remedy these drawbacks and to this end it consists in principle in providing a porous body with one or more cavities into which the air, or other gas may freely penetrate.

It is of advantage to ensure a continuous circulation of the gas in these cavities by suitable means for example by two or more tubes of various length which extend thereinto in such a manner as to create a natural draught.

Preferably, the longest tube extends outside the electrode, so that it may be in contact with the electrolyte, and it issues at the base of the electrode.

The electrolyte is prevented from encroaching upon the cavity or cavities provided in the porous body and for this purpose, the porous body may be treated in the known manner, to render it practically impermeable to liquids, while remaining permeable to gases. It may, for example, be impregnated with a fatty substance dissolved in a volatile solvent which is evaporated in a suitable manner, in particular by the process described in French Patent No. 594,705. The porous body may also be treated by one of the processes described in U. S. A. Patents No. 1,574,844, No. 1,544,030 and No. 1,678,405.

An effective process for preventing the electrolyte from penetrating into the cavities of the electrode consists in keeping the gas contained in the cavities under slight excess pressure, for example by blowing into it air, oxygen, or any other suitable gas. In this manner, the continuous renewal of the gas contained in the cavities is automatically assured.

The porous body may be constituted by an agglomerate which is porous and conductive of electricity, for example porous carbon, and provided with a suitable current collector. It may also be constituted by a porous powder rendered practically impermeable to liquids but permeable to gases, for example by the process described in the U. S. A. Patents No. 1,552,871 and 1,588,607 and agglomerated alone, or with the addition of powdered graphite, or any other suitable ingredients.

In any case, the porous agglomerate may be enclosed in a suitable protective envelope made of calico, hemp, porous ceramic material or the like and this envelope may itself be treated by a known means in order to render the same practically impermeable to liquids but permeable to gases.

In order to explain the present invention, two constructional methods, given merely by way of example, will be described with the aid of the accompanying drawing, it being possible to make alterations therein without affecting the principle of the invention.

Figure 1 represents a vertical section and Figure 2 a horizontal section through A—A of Figure 1 of a battery of the type previously mentioned having a jelly or stable electrolyte constructed according to the invention. Figures 3 and 4 illustrate cells having liquid electrolytes and modified electrodes.

1 is the container made of suitable insulating material, 2 is the negative electrode made of zinc, 3 is the electrolyte rendered stable by a known process, and 4 is the agglomerate or porous body which is practically impermeable to liquids but permeable to gases. According to the invention, this agglomerate is provided with two cavities 5 and 5', in communication with the atmosphere through orifices 6 and 6', and intercommunicating through a hole 7 provided in a plate 8 consisting of retort carbon, which serves as a current collector or terminal.

9 is a medium which serves to seal the battery.

Figure 3 represents a vertical section of a battery having a liquid electrolyte which may be either neutral, alkaline or acid.

The positive electrode 4 is constituted by a porous carbon agglomerate, which is cylindrical, rectangular or of any suitable form. This agglomerate is rendered practically impermeable to liquids but permeable to gases by means of a known process. A cavity 5 which is annular or is shaped according to that of the electrode used is provided and the agglomerate is locked between two plates 10 and 11 of a metal which is not affected by the electrolyte. The two plates are connected together by an embedded metal rod 14, or sealed in the agglomerate and permitting suspension from a cover 9. The upper plate 11 is fitted with two or more tubes 12 and 13 differing in length and extending above the level of the electrolyte 3, in such a manner as to place the cavity 5 in direct communication with the atmosphere and to assure a circulation of air.

The zinc electrode 2 may also be suspended from the cover 9.

In the form of construction illustrated in Fig. 4, the short tube 12 extends from the upper part and opens above the electrolyte 3. The long tube 13, which also extends above the level of the electrolyte, is arranged laterally to the agglomerate or porous body 4 and opens in the bottom.

In these conditions natural draught is always ensured. The temperature in the electrode is greater than that of the electrolyte. Consequently, a down stream of cold air takes place in the tube 13 and hot air escapes through the tube 12. The variations of temperature at the exterior have not any influence on this operation.

The tube 13 might also open at the lower part of the side walls.

It will be perceived that the new process enables batteries depolarizing by means of oxygen in the air to be constructed in which the positive electrode is nevertheless completely immersed in the electrolyte, which is advantageous.

The arrangements described above are only given by way of example; all the details of execution, the forms, dimensions and materials used may be varied in all cases, without changing the principle of the invention as defined by the appended claims.

I claim:

1. In an air-depolarized primary cell adapted for operation with an alkaline electrolyte, a container, an electrode of activated carbon within the container below the normal liquid level of electrolyte therein, said electrode being provided with an interior air chamber sealed against access of electrolyte, and an open conduit providing communication between said air chamber and the atmosphere.

2. In an air-depolarized primary cell employing an alkaline electrolyte, a container, a hollow, activated carbon electrode therewithin mounted in such a way as to be completely submerged below the normal liquid level of said electrolyte and a conduit leading from the interior of said activated carbon electrode to the atmospheric air to furnish air to said electrode for depolarizing.

RENÉ OPPENHEIM.